(12) United States Patent
Yin et al.

(10) Patent No.: US 8,089,724 B2
(45) Date of Patent: Jan. 3, 2012

(54) SELF-ALIGNED PERPENDICULAR WRITER POLE AND FRONT SHIELD

(75) Inventors: Huaqing Yin, Eden Prairie, MN (US); Chris J. Rea, Edina, MN (US); Jianhua Xue, Maple Grove, MN (US); Steve A. Mastain, Chanhassen, MN (US)

(73) Assignee: Seagate Technology LLC, Cupertino, CA (US)

( * ) Notice: Subject to any disclaimer, the term of this patent is extended or adjusted under 35 U.S.C. 154(b) by 898 days.

(21) Appl. No.: 12/123,288

(22) Filed: May 19, 2008

(65) Prior Publication Data

US 2009/0284874 A1    Nov. 19, 2009

(51) Int. Cl.
 *G11B 5/127* (2006.01)
(52) U.S. Cl. .................................... 360/125.3
(58) Field of Classification Search ............ 360/125.3, 360/125.03, 317, 125.09, 125.04, 123.1, 360/125.17, 125.12, 125.16, 125.06, 125.15, 360/122, 125.26, 125.19
See application file for complete search history.

(56) References Cited

U.S. PATENT DOCUMENTS

| | | | |
|---|---|---|---|
| 5,801,910 A | 9/1998 | Mallary | |
| 6,428,657 B1 * | 8/2002 | Pinarbasi | 204/192.11 |
| 6,594,112 B1 | 7/2003 | Crue et al. | |
| 7,009,812 B2 | 3/2006 | Hsu et al. | |
| 7,014,530 B2 | 3/2006 | Kasiraj et al. | |
| 7,054,105 B2 | 5/2006 | Mochizuki et al. | |
| 7,120,988 B2 | 10/2006 | Le et al. | |
| 7,159,302 B2 | 1/2007 | Feldbaum et al. | |
| 7,268,974 B2 * | 9/2007 | Lille | 360/125.06 |
| 7,688,544 B1 * | 3/2010 | Mallary et al. | 360/125.06 |
| 2003/0174834 A1 * | 9/2003 | Kida | 379/428.01 |
| 2005/0190491 A1 | 9/2005 | Le et al. | |
| 2005/0259356 A1 | 11/2005 | Han et al. | |
| 2006/0002024 A1 | 1/2006 | Le et al. | |
| 2006/0028770 A1 | 2/2006 | Etoh et al. | |
| 2006/0044681 A1 | 3/2006 | Le et al. | |
| 2006/0044682 A1 | 3/2006 | Le et al. | |
| 2006/0082924 A1 | 4/2006 | Etoh et al. | |
| 2006/0221497 A1 | 10/2006 | Okada et al. | |
| 2006/0238918 A1 | 10/2006 | Kato et al. | |
| 2006/0262440 A1 | 11/2006 | Sasaki et al. | |
| 2006/0288565 A1 | 12/2006 | Le et al. | |
| 2006/0291096 A1 | 12/2006 | Sasaki et al. | |

\* cited by examiner

*Primary Examiner* — Allen Cao

(74) *Attorney, Agent, or Firm* — HolzerIPLaw, PC

(57) ABSTRACT

A write pole structure includes a write pole having a tip region. A shield structure is spaced from the write pole by a gap at the tip region. The shield structure includes a front shield and a spacer layer on the back of the front shield. A yoke is formed on the write pole, and an end of the yoke is aligned with the back end of the spacer layer.

20 Claims, 7 Drawing Sheets

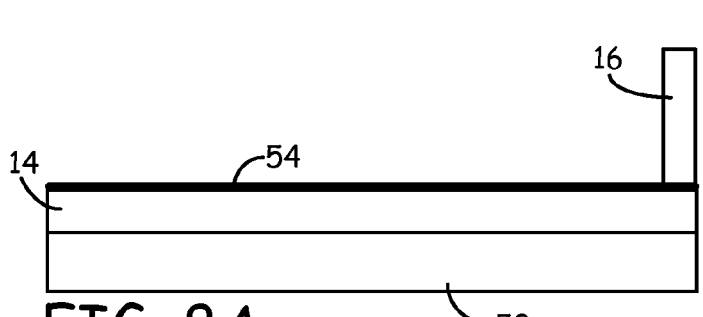 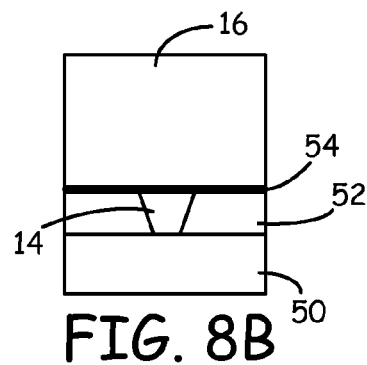
FIG. 8A  FIG. 8B
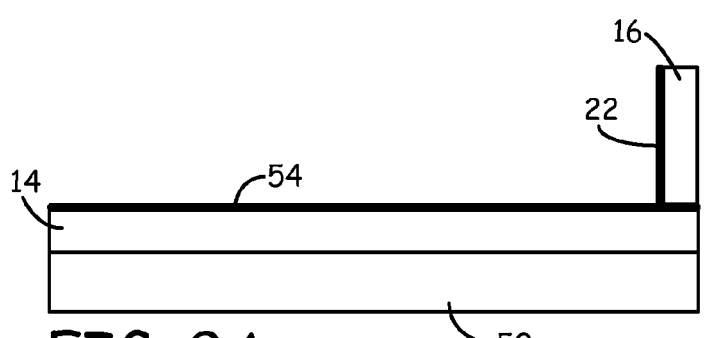 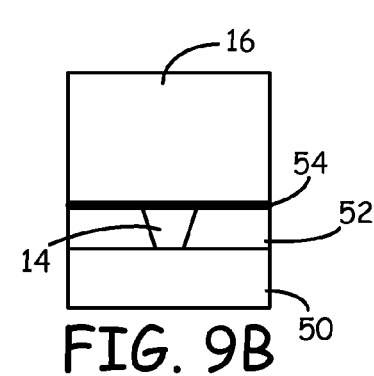
FIG. 9A  FIG. 9B
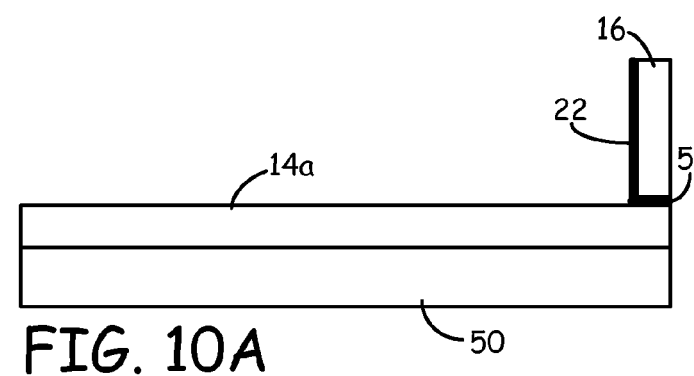 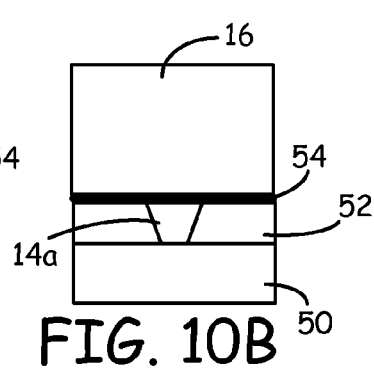
FIG. 10A  FIG. 10B
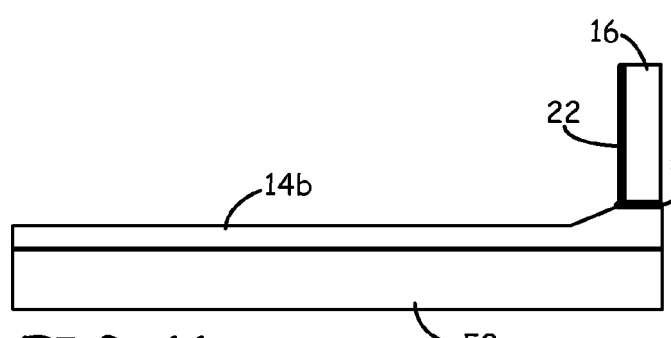 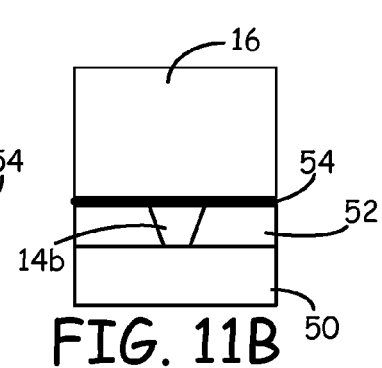
FIG. 11A  FIG. 11B

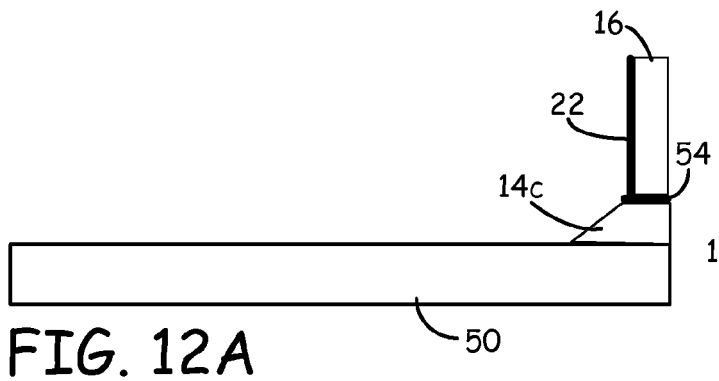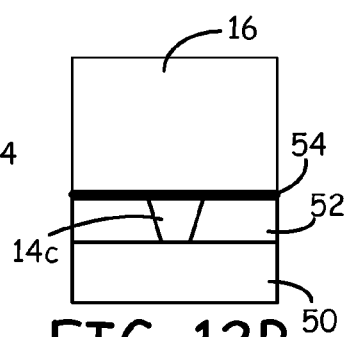
FIG. 12A    FIG. 12B
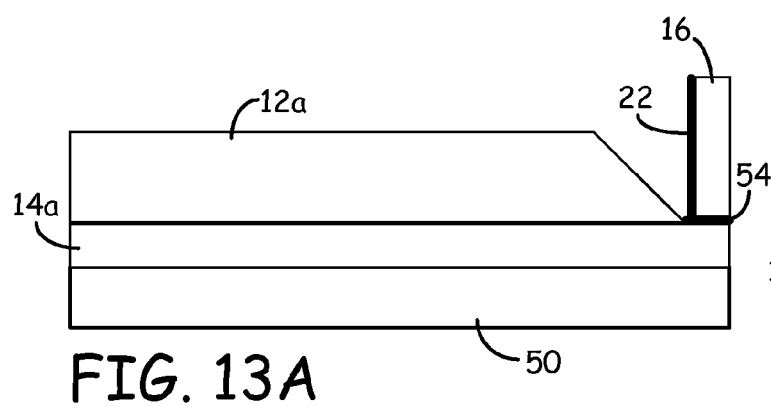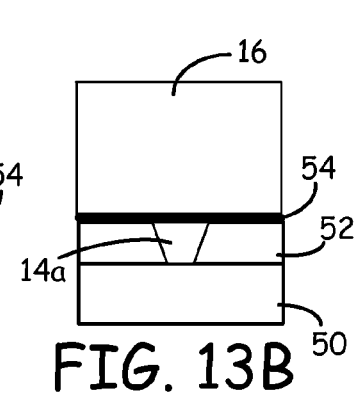
FIG. 13A    FIG. 13B
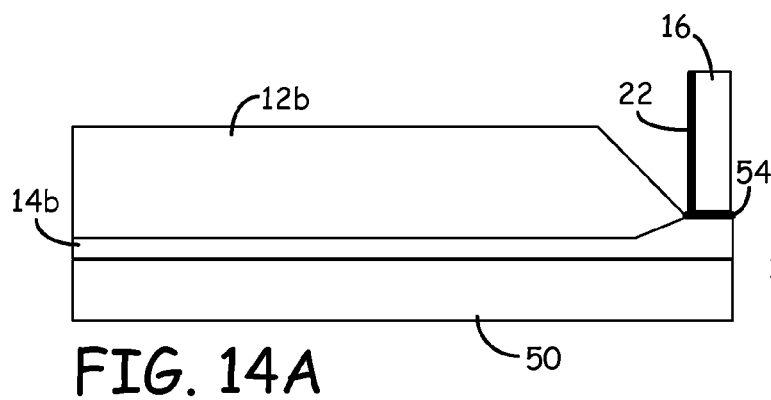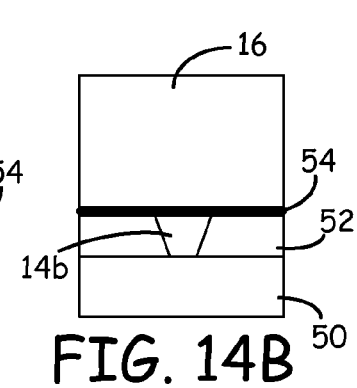
FIG. 14A    FIG. 14B

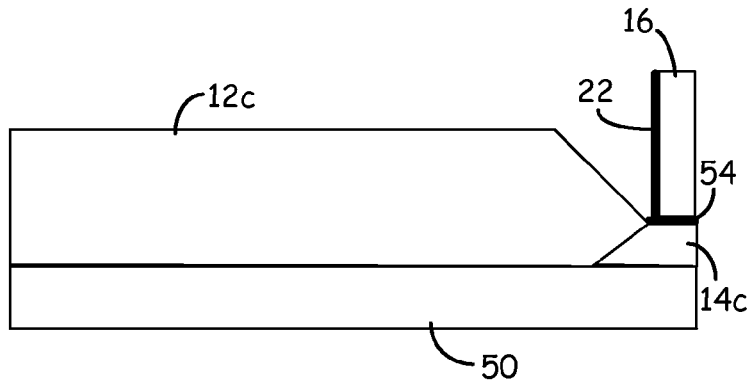 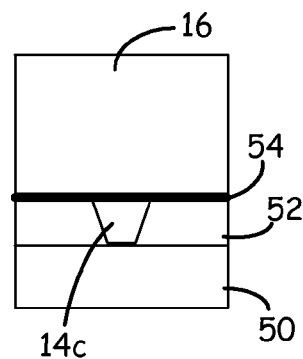
FIG. 15A            FIG. 15B
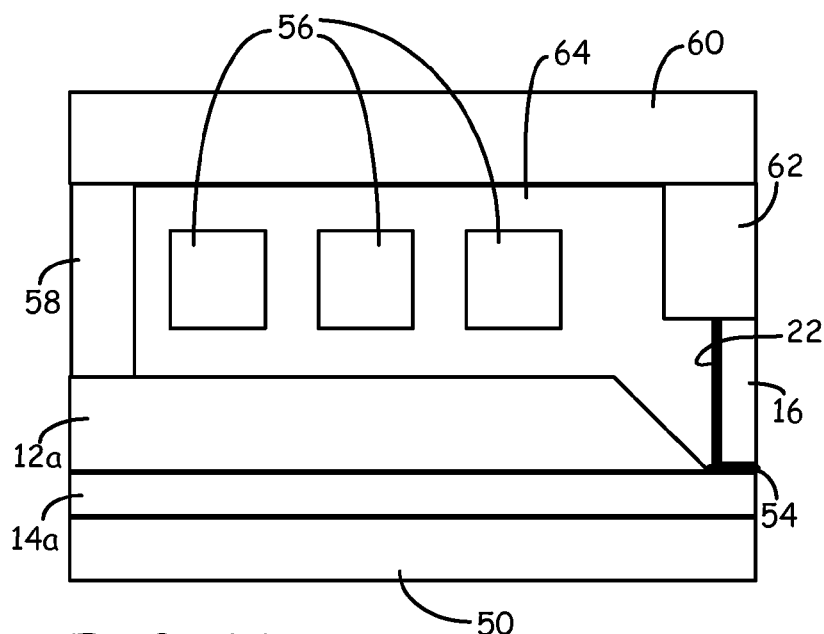 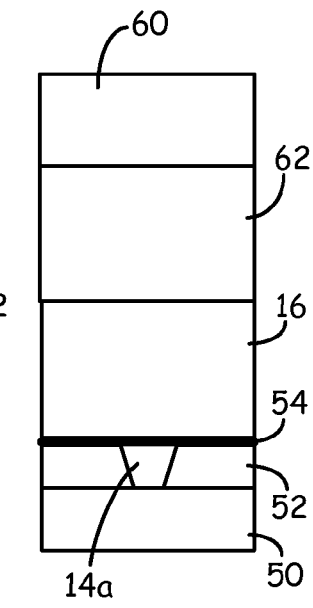
FIG. 16A            FIG. 16B

SELF-ALIGNED PERPENDICULAR WRITER POLE AND FRONT SHIELD

BACKGROUND

The present invention relates to a magnetic data storage device, and more particularly to a write pole for a perpendicular writer having improved control over critical dimensions.

As magnetic recording storage densities continue to progress in an effort to increase the storage capacity of magnetic storage devices, magnetic transition (i.e., bit) dimensions and critical features of the recording device are being pushed below 100 nanometers (nm), particularly for writers that operate on the principle of perpendicular recording. This decrease in critical dimensions presents a significant challenge to the manufacture of devices such as perpendicular writers due to the corresponding decrease in the error tolerance margin associated with production of the devices. For example, in a perpendicular writer, the dimensions of the write pole break point (WP BP) and the front shield throat height (FS TH) are critical dimensions defined during the slider lapping process, and typically are targeted to be approximately 100 nm or less. These dimensions have traditionally been defined by two independent photolithography layers in wafer fabrication, which results in an error (3-sigma) of about 50 nm, five times larger than an exemplary 10% tolerance margin. This range of variation results in a poor yield of devices that meet specifications. A design and/or process that reduces the error associated with the production of devices such as these would be a desirable improvement to the state of the art.

SUMMARY

The present invention is a write pole structure and a method of forming the write pole structure. The write pole structure has a tip region, and a shield structure is spaced from the write pole by a gap at the tip region. The shield structure includes a front shield and a spacer layer on the back of the front shield. A yoke is formed on the write pole, and an end of the yoke is aligned with the back end of the spacer layer.

The write pole structure is formed by forming a write pole, forming a write gap with non-magnetic material on the write gap at a tip portion of the write pole, forming a front shield structure on the non-magnetic write gap material at the tip portion of the write pole, where the front shield structure includes a front shield and a spacer layer on a back side of the front shield, and forming a yoke on the write pole that has a front edge aligned with a back edge of the spacer layer on the back side of the front shield.

DETAILED DESCRIPTION

Figure 1A:
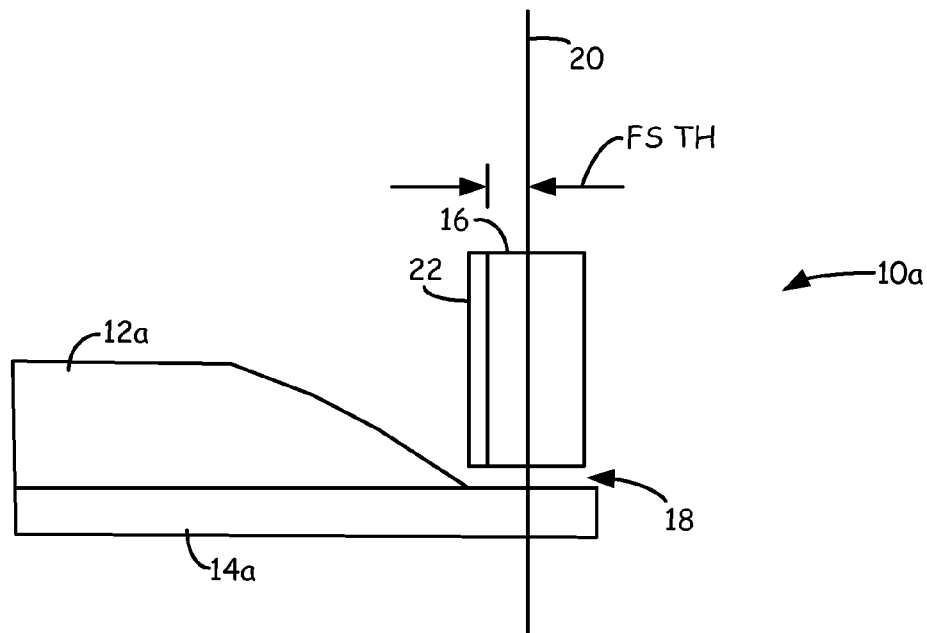
FIGS. 1A-1C are side layer diagrams of a self-aligned perpendicular writer.
Figure 1B:
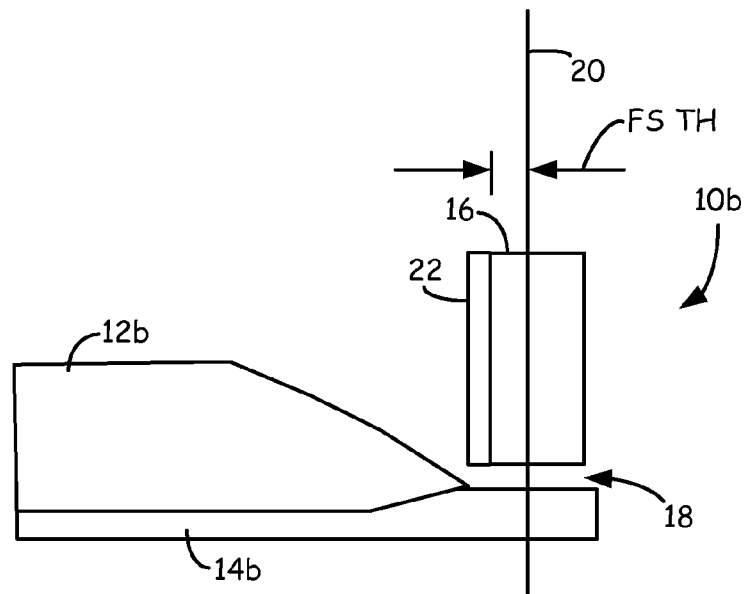
Figure 1C:
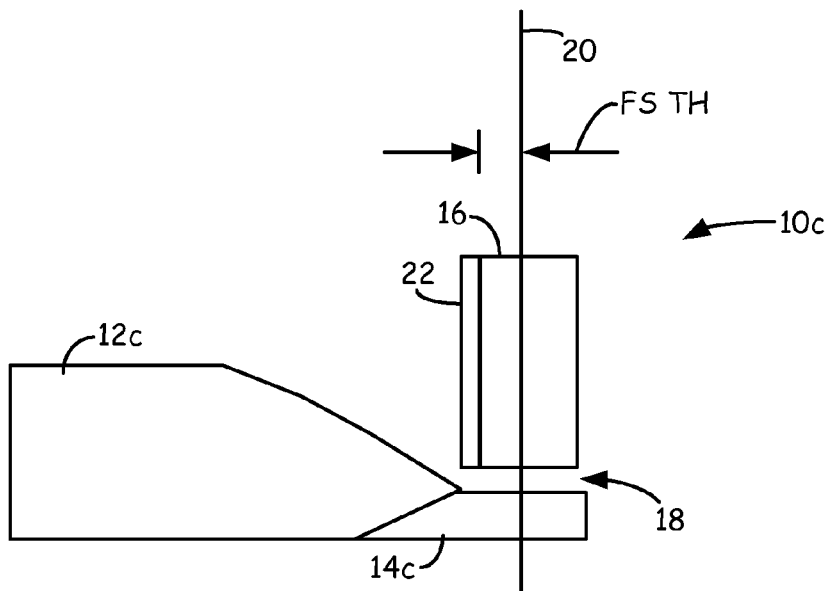
Figure 2:
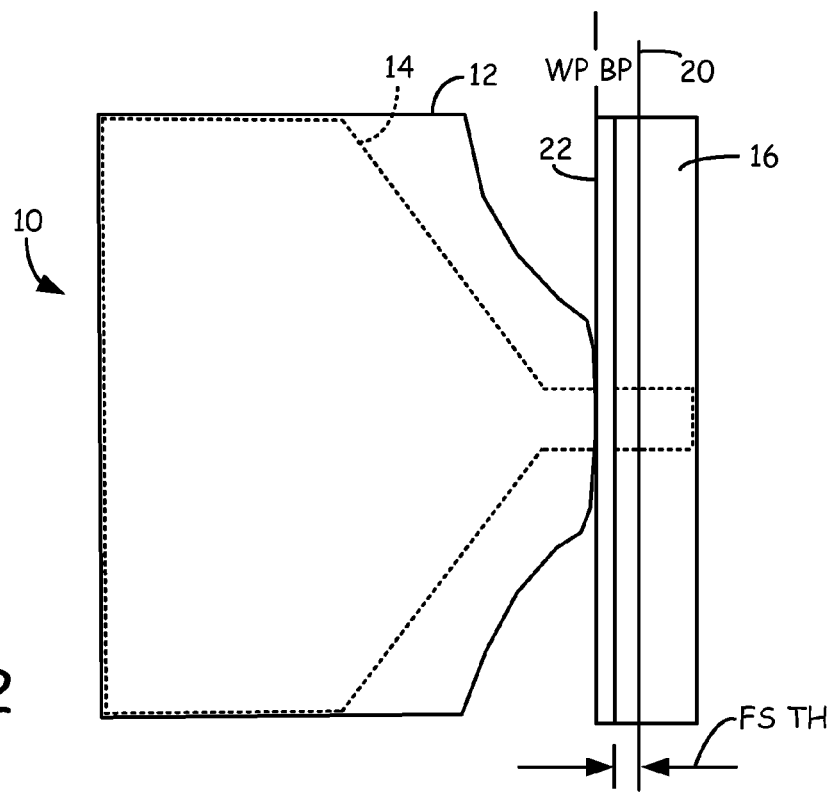
FIG. 2 is a top view of a self-aligned perpendicular writer as shown in any of FIGS. 1A-1C.

FIGS. 1A-1C are side layer diagrams of a self-aligned perpendicular writer according to first, second and third embodiments of the present invention. FIG. 1A shows self-aligned perpendicular writer 10a having self-aligned write pole yoke 12a on unmilled write pole 14a. FIG. 1B shows self-aligned perpendicular writer 10b having self-aligned write pole yoke 12b on partially milled write pole 14b. FIG. 1C shows self-aligned perpendicular writer 10c having self-aligned write pole yoke 12c on milled-through write pole 14c. FIG. 2 is a top view of self-aligned perpendicular writer 10 (this view is the same for all three embodiments shown in FIGS. 1A-1C). In all three embodiments, front shield 16 is spaced from write pole 14 by write gap 18 in the vicinity of air-bearing surface (ABS) 20. A front shield structure includes front shield 16 having spacer 22 on its back surface facing toward write pole yoke 12. In accordance with the present invention, the front edge of write pole yoke 12 is precisely aligned with the back edge of spacer 22, so that the write pole break point (WP BP) and the front shield throat height (FS TH) of perpendicular writer 10 are precisely controllable.

In most existing perpendicular writer designs, the writer yoke is formed first, and the write pole is then formed on top of the writer yoke. As can be seen in FIGS. 1A-1C, self-aligned perpendicular writers 10a-10c are designed with write pole yokes 12a-12c formed on top of write poles 14a-14c. As will be explained in more detail below, this allows certain critical dimensions (such as the write pole break point (WP BP, illustrated in FIG. 2) and the front shield throat height (FS TH, illustrated in FIGS. 1A-1C)) to be controlled with greater precision than was possible in prior designs.

Figure 3:
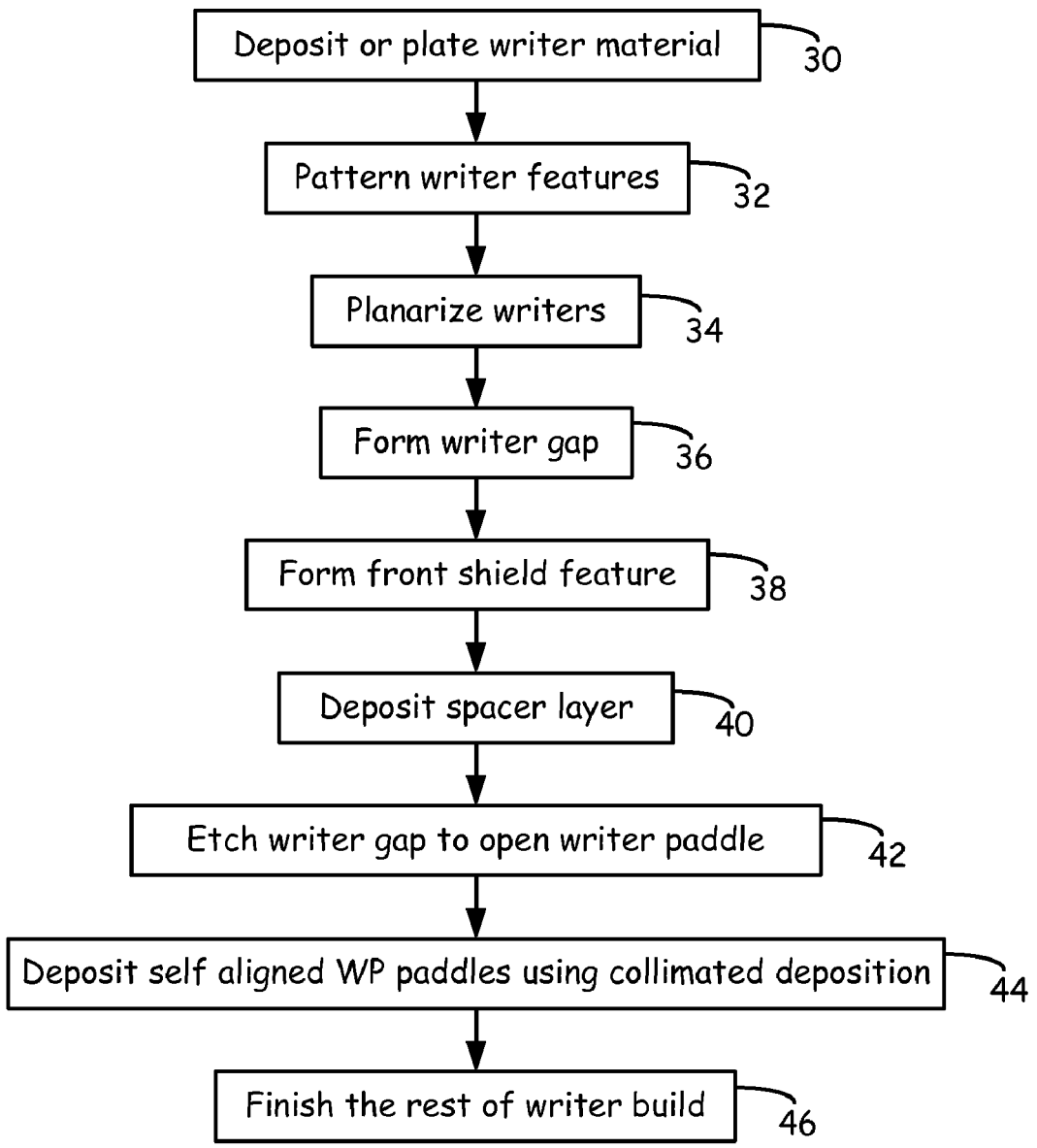
FIG. 3 is a flow diagram illustrating an example of a procedure for fabricating a self-aligned perpendicular writer.

FIG. 3 is a flow diagram illustrating an example of a procedure for fabricating a self-aligned perpendicular writer. In an initial step (step 30), writer material is deposited or plated on a substrate. Writer features are then patterned (step 32) to form the write pole in the proper shape, and material is deposited around the write pole to planarize the write pole so that additional layers can be formed on it (step 34). A non-magnetic material is then formed on the planarized write pole to form a write gap (step 36), and a front shield is deposited on the non-magnetic write gap material in a tip region of the write pole near the front edge of the writer (step 38). A spacer layer is then deposited on the back of the front shield (step 40), and the non-magnetic write gap material is etched to open a space for the writer yoke to be formed (step 42). Portions of the write pole may also be milled at this point (as shown in the embodiments of FIGS. 1B and 1C). The self-aligned writer yoke is then deposited utilizing a collimated deposition technique (step 44), with the front edge of the writer yoke being aligned with the back of the spacer layer on the back of the front shield. The remainder of the writer is then built over the writer yoke (step 46).

Figure 4A:
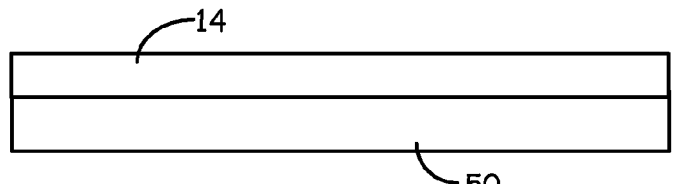
FIGS. 4A/4B-16A/16B are layer diagrams and end views illustrating exemplary steps of fabricating a self-aligned perpendicular writer.
Figure 4B:
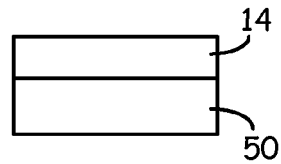

FIGS. 4A/4B-16A/16B are layer diagrams and end views illustrating exemplary steps of fabricating a self-aligned perpendicular writer. FIGS. 4A and 4B illustrate the step of depositing or plating write pole 14 on substrate 50 (step 30, FIG. 3).

Figure 5A:
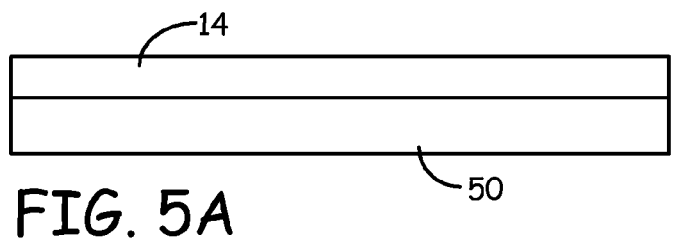
Figure 5B:
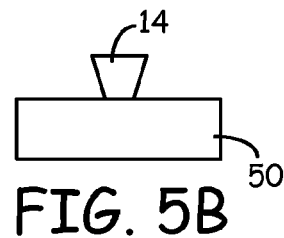

FIGS. 5A and 5B illustrate the step of patterning writer features to form write pole 14 in the proper shape (step 32, FIG. 3).

Figure 6A:
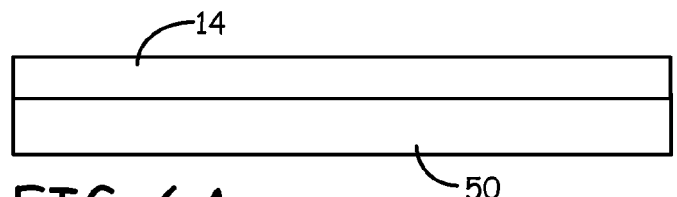
Figure 6B:
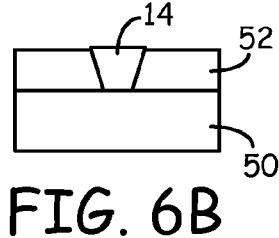

FIGS. 6A and 6B illustrate the step of depositing material 52 around write pole 14 to planarize write pole 14 so that additional layers can be formed on it (step 34, FIG. 3).

Figure 7A:
Figure 7B:
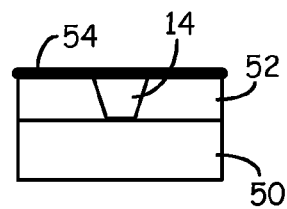

FIGS. 7A and 7B illustrate the step of forming write gap 54 with non-magnetic material over write pole 14 and planarizing material 52 (step 36, FIG. 3).

FIGS. 8A and 8B illustrate the step of forming front shield 16 on non-magnetic write gap 54 in a tip region near the front edge of write pole 14 (step 38, FIG. 3).

FIGS. 9A and 9B illustrate the step of depositing spacer layer 22 on the back of front shield 16 (step 40, FIG. 3).

FIGS. 10A and 10B, 11A and 11B, and 12A and 12B illustrate the step of etching the material of non-magnetic write gap 54 behind the front shield structure (including spacer layer 22 and front shield 16) in order to open a space for the writer yoke to be formed (step 42, FIG. 3). FIGS. 10A and 10B illustrate this step with no milling of write pole 14a, FIGS. 1A and 1B illustrate this step with partial milling of write pole 14b, and FIGS. 12A and 12B illustrate this step with write pole 14c having a back portion milled through.

FIGS. 13A and 13B, 14A and 14B, and 15A and 15B illustrate the step of depositing self-aligned writer yokes 12a (FIGS. 13A and 13B—unmilled write pole 14a), 12b (FIGS. 14A and 14B—partially milled write pole 14b) and 12c (FIGS. 15A and 15B—milled-through write pole 14c) (step 44, FIG. 3). In all three embodiments, self-aligned writer yoke 12 is deposited utilizing a collimated deposition technique (such as collimated sputtering or plasma deposition, or other known collimated deposition techniques), so that the front edge of writer yoke 12 is aligned with the back of spacer layer 22 on the back of front shield 16. In an exemplary embodiment, writer yoke 12 is formed with a bevel angle between about 20 and 45 degrees, such as about 30 degrees in one particular embodiment. The writer yoke 12 provides an extended magnetic flux delivery path to write pole 14 which increases the writer efficiency, and the beveled front edge of writer yoke 12 functions as the writer pole break point (WP BP) parameter that is critical to dimensionally control.

FIGS. 16A and 16B illustrate the step of building the remainder of the writer over write yoke 12a (step 46, FIG. 3). This step is only shown with respect to the embodiment in which the write pole is unmilled for the sake of simplicity, since the step would be similar for the partially milled write pole and the milled-through write pole embodiments as well. Specifically, coils 56, magnetic stud 58, return pole 60, shield element 62 and insulating layer 64 are formed to build the writer, as is generally known in the art.

The write pole structure of the present invention allows both the front shield throat height (FS TH) and the writer pole break point (WP BP) to be defined by a single lapping step. The front shield throat height (FS TH) is determined by the amount of lapping from the front side of the writer to form a front writer surface (such as an air bearing surface in a conventional disc drive application, for example). The amount of lapping is precisely controllable by advanced lapping techniques known in the art, such as by using a writer electrical lapping guide (WELG), for example. In addition, the writer pole break point (WP BP) is defined by the position of the front edge of writer yoke 12, which is controlled by the process described above to have a front edge that is precisely aligned with the back edge of spacer 22 on the back of front shield 16. Controlling these two dimensions with a single, high precision lapping step, rather than in two independent photolithographic steps as was done in convention designs, provides a significant reduction in the tolerance error of the dimensions, producing greater yields of products that can meet stringent specifications.

The write pole structure disclosed above employs a writer yoke on top of the write pole, rather than below the write pole as in conventional designs, and is formed by a process that aligns a front edge of the writer yoke with a back edge of a front shield throat structure. As a result, both the front shield throat height (FS TH) and the writer pole break point (WP BP) of the writer are precisely controllable with a single lapping step, reducing error associated with fabrication of the writer. Finite element modeling (FEM) has shown that the write pole structure disclosed above is able to produce at least the same fields and gradients that are achieved by traditional perpendicular writer designs with front shields. The design of the present invention is therefore able to provide greater yields of devices that meet specifications than prior designs.

Although the present invention has been described with reference to preferred embodiments, workers skilled in the art will recognize that changes may be made in form and detail without departing from the spirit and scope of the invention.

The invention claimed is:

1. A write pole structure comprising:
a write pole having a tip region;
a shield structures spaced from the write pole by a gap at the tip region, the shield structure being formed of a shield material on a front portion of the shield structure and a spacer on a back portion of the shield structure; and
a yoke formed on the write pole, the yoke having an end that is aligned with a back end of the spacer.

2. The write pole structure of claim 1, wherein the end of the yoke that is aligned with the back end of the spacer is beveled.

3. The write pole structure of claim 2, wherein the end of the yoke that is aligned with the back end of the spacer has a bevel angle between 20 degrees and 45 degrees.

4. The write pole structure of claim 3, wherein the bevel angle is about 30 degrees.

5. The write pole structure of claim 1, wherein the write pole has a flat upper surface on which the yoke is formed.

6. The write pole structure of claim 1, wherein the write pole has a partially indented upper surface on which the yoke is formed.

7. The write pole structure of claim 6, wherein the write pole has a beveled portion adjacent to the partially indented upper surface.

8. The write pole structure of claim 1, wherein a first portion of the write pole is completely removed outside of the tip region, and the yoke is on a second portion of the write pole adjacent to the tip region.

9. The write pole structure of claim 8, wherein the second portion of the write pole is approximately 0.5 micrometers (μm) in length as its base.

10. The write pole structure of claim 8, wherein the second portion of the write pole has a beveled portion adjacent to the yoke.

11. The write pole structure of claim 1, wherein the end of the yoke that is aligned with the back end of the spacer defines a writer pole break point (WP BP).

12. A method of forming a write pole structure, the method comprising:
forming a write pole;
forming a write gap with non-magnetic materials on the write pole at a tip portion of the write pole;
forming a front shield structure on the non-magnetic write gap material at the tip portion of the write pole, the front shield structure including a front shield and a spacer layer on a back side of the front shield; and
forming a yoke on the write pole, the yoke having a front edge that is aligned with a back edge of the spacer layer on the back side of the front shield.

13. The method of claim 12, wherein the yoke is formed by a collimated deposition technique to ensure alignment of the front edge of the yoke with the back edge of the spacer layer on the back side of the front shield.

14. The method of claim 12, further comprising:

partially removing a portion of the write pole spaced from the tip portion prior to forming the yoke.

15. The method of claim 12, further comprising:

Completely removing a portion of the write pole spaced from the tip portion prior to forming the yoke.

16. The method of claim 12, wherein the write gap is formed over all of the write pole, and is removed from all but the tip portion of the write pole between the front shield structure and the write pole prior to forming the yoke on the write pole.

17. The method of claim 12, wherein the yoke is formed with a bevel angle between 20 degrees and 45 degrees.

18. The method of claim 12, further comprising:

lapping a front surface of the front shield, the write gap and the write pole to form a smooth surface for confronting a data storage medium.

19. The method of claim 18, wherein the step of lapping the front surface of the front shield, the write gap and the write pole controls both a writer pole break point (WP BP) defined by the front edge of the yoke and a throat height of the front shield (FS TH).

20. The method of claim 12, further comprising forming coils arranged to form a magnetic perpendicular writer employing the write pole structure.

* * * * *